Patented July 8, 1930

1,770,052

UNITED STATES PATENT OFFICE

VANDERVEER VOORHEES, OF HAMMOND, INDIANA, ASSIGNOR TO STANDARD OIL COMPANY, OF CHICAGO, ILLINOIS, A CORPORATION OF INDIANA

FILTER AID

No Drawing.      Application filed June 22, 1929. Serial No. 373,070.

This invention relates to the process of filtration for the removal of solids from liquids and more particularly to the use, in this process, of substances known as filter aids. It is common practice in the filtration of slimy materials, which tend to form an impervious coating on the filtering surfaces, to add certain finely divided substances, such as calcium sulfate, fuller's earth and the like, to the slurry of material to be filtered, the purpose being to increase the porosity of the filter cake and to accelerate filtration. When these substances are used it is often necessary to recover them from the remainder of the filter cake formed during the filtration because of the value of the materials in the cake or the value of the filter aid for repeated use, and this additional step may add considerably to the cost of the process, sometimes making the use of a filter aid prohibitive. Furthermore, the number of times a filter aid may be reused is limited, as there is a progressive depreciation and loss.

I have now discovered that I may avoid these difficulties in a unique and novel way. I conduct the filtration at temperatures below 32° F. and with the cold slurry, I mix a proportion of finely crystallized ice. Ice crystals act as an efficient filter aid and possess the great advantage of being easily removed from the filter cake by merely warming to melt the ice, whereupon the resulting water can be separated in any convenient manner. My improved process employing ice crystals as a filter aid is necessarily limited to liquids which will not cause the ice to melt at the temperatures employed and is particularly adapted to be used with oils or other liquids nonmiscible with water.

The ice crystals employed as a filter aid may be prepared by spraying water into a current or chamber of air, which is cooled to cause the water to freeze in the form of fine ice crystals. The size of crystals may be suitably controlled by regulating the temperature of the air, the manner of spraying, the rate of cooling and by other well known means of controlling crystal growth. It will be recognized that the size of crystals desired may vary with the precise filtration operation in which they are to be employed.

The following example will serve to illustrate one application of my invention:

It is desired to remove the paraffin wax from a wax bearing petroleum distillate. To a quantity of this distillate, containing from five to ten per cent of paraffin wax and chilled to a temperature below 32° F., say 15° F., is added the ice crystal filter aid in the proportion of one-half to one-and-one-half pounds of filter aid per gallon of distillate. After thoroughly mixing, the slurry of ice crystals, wax and oil is forced through a cold filter press of the type commonly used in wax separation employing either pressure or suction. After filtration, the cake consisting of ice crystals, wax and adhering oil is warmed to a temperature above the melting point of the wax and ice crystals, thus permitting the resulting water to settle from the wax and oil.

Because of the cheapness of the ice crystal filter aid, there is no problem of recovery involved, and this is an important feature of my invention inasmuch as it makes available for the filtration operation a uniform quality of filter aid which has never been subject to deterioration in use. A further advantage arises from the fusible nature of the ice crystal filter aid, when it is used in wax filtration, in that, when it is used in the closed type press such as the conventional plate press, it is not necessary to open the press to remove the filter aid, at the end of a run, but both the filter aid and the wax may be melted by heating and caused to flow from the press.

The ice crystal filter aid is especially adapted to be used where it is necessary to cool a liquid to low temperatures previous to filtration for the crystallization of one of its components or for other purposes. In such cases, the necessity of cooling previous to using the ice crystal filter aid adds no additional cost to the existing processes of filtration.

Although I have given a specific application of my invention, I do not intend it to be a limitation on its scope except as defined in the following claims.

I claim:

1. The process of separating solids from liquids, which comprises mixing finely divided ice particles with the slurry of material to be filtered in a sufficient amount to act as a filter aid, and then filtering to remove the solids and the ice particles, the operation being carried out at temperatures sufficiently low to prevent the melting of said ice particles.

2. In the filtration of difficultly filtrable slurries, the admixing with the slurry of a filter aid comprising finely divided ice particles for the purpose of increasing the porosity of the filter cake and accelerating the filtration.

3. In the separation of solids and liquids contained in a slurry, the cooling of said slurry below the melting point of ice, the freezing of water in a suitable manner to form finely divided ice particles, the distribution of a suitable proportion of said ice particles in said slurry to act as a filter aid, and the removal of a large proportion of the liquid from the resulting mixture by causing it to flow through a fabric or other porous membrane which will retain the solid portion.

4. The method of separating paraffin wax from oil which comprises chilling the wax and oil to a temperature below the melting point of ice, incorporating finely divided ice particles in this mixture in a sufficient amount to act as a filter aid, separating substantially all the oil from the wax and ice by means of a filter, removing the cake from the filter and melting the ice and wax to effect a separation thereof.

5. The method of separating difficultly filtrable solids from oils which comprises cooling the oil below 32° F., mixing therewith a quantity of finely divided ice particles, separating the oil from the ice particles and solids, melting the ice particles and separating the resulting water from the solids.

6. In the separation of mixtures of hydrocarbons, part of which crystallizes readily on cooling and part of which remain liquid at relatively low temperatures, the process of cooling to a temeperature below the melting point of ice, adding finely divided ice particles in a sufficient amount to act as a filter aid, mixing and filtering to remove the liquid hydrocarbons from the solid hydrocarbons and ice particles.

7. In the removal from an oil of a dissolved component which separates on cooling as a finely divided, difficultly filtrable solid, the procedure which involves cooling below the melting point of ice to separate said solid, admixing finely divided ice particles therewith and filtering to remove the oil from the solid and admixed ice particles.

8. The process of separating a liquid from a gelatinous solid comprising cooling to a temperature below the melting point of ice, admixing therewith finely divided ice particles in a sufficient amount to act as a filter aid, filtering at a temperature below the melting point of ice to obtain a filter cake of ice particles and gelatinous solid and melting the ice in said filter cake to separate it from the gelatinous solid.

9. The improvement in the separation of wax from chilled hydrocarbon oils comprising incorporating with the oil a filter aid composed of finely divided ice particles, forcing the resulting slurry through a filter to separate the oil from suspended solids, and supplying heat to the filter to melt the wax and the filter aid.

Signed at Chicago, Illinois, this 18th day of June, A. D. 1929.

VANDERVEER VOORHEES.